United States Patent
Corghi

(10) Patent No.: US 6,227,277 B1
(45) Date of Patent: May 8, 2001

(54) TIRE REMOVAL MACHINE

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 09/157,579

(22) Filed: Sep. 21, 1998

(30) Foreign Application Priority Data

Oct. 24, 1997 (IT) ............................................. RE97A0077

(51) Int. Cl.[7] .................................................. B60C 25/135
(52) U.S. Cl. ........................ 157/1.24; 157/1.22; 157/1.17
(58) Field of Search ................... 157/1.17, 1.22, 157/1.24; 361/23, 31; 318/527, 246, 247, 248, 249, 250, 251, 252

(56) References Cited

U.S. PATENT DOCUMENTS

| 4,840,215 | * | 6/1989 | Vijay et al. ........................ 157/1.24 |
| 4,959,747 | * | 9/1990 | Koeplin ................................. 361/31 |
| 5,196,772 | * | 3/1993 | Kupka et al. . | |
| 5,490,552 | * | 2/1996 | Vignoli ............................... 157/1.24 |
| 5,747,955 | * | 5/1998 | Rotunda et al. ..................... 318/434 |
| 5,764,463 | * | 6/1998 | Arvidson ............................. 361/18 |
| 5,836,368 | * | 11/1999 | Corghi ............................... 157/1.24 |
| 6,137,418 | * | 9/2000 | Zuercher ............................. 340/648 |

FOREIGN PATENT DOCUMENTS

| 2621236 | * | 11/1977 | (DE) ................................. 157/1.24 |
| 3801852 | * | 8/1988 | (DE) ................................. 157/1.22 |
| 4205045 C1 | * | 8/1993 | (DE) . | |

OTHER PUBLICATIONS

J.L. Watts: "Series Alternating Current Motors—II, " Practical Engineering Mar. 27, 1953, pp. 317–318, XP002093538.*

J.L. Watts. "Series Alternating Cyrrent Motors—II, " Practical Engineering, Mar. 27, 1953, pp. 317–318, XP002093538.*

* cited by examiner

Primary Examiner—Joseph J. Hail, III
Assistant Examiner—Daniel Shanley
(74) Attorney, Agent, or Firm—Birch, Stewart, Kolasch & Birch, LLP

(57) ABSTRACT

A tire removal machine comprising a rotary platform for supporting the wheel, means for acting on the tire bead and platform operating means, wherein the operating means are a single-phase electric motor with series excitation, connected to a single-phase feed line at 110V a.c. via a voltage rectifier, means being provided for limiting current absorption to a predetermined value.

5 Claims, 4 Drawing Sheets

TIRE REMOVAL MACHINE

BACKGROUND OF THE INVENTION

1. Field of the Invention

This invention concerns machines for mounting and removing a tire on and from a wheel rim, and in particular relates to the means for their operation.

2. Related Art

Known machines for tire mounting and removal on and from a wheel rim comprise an outer sheet metal casing, on the top of which there is located a rotary platform provided with self-centering means for locking the wheel rim.

To the side of the rotary platform there extends a vertical structure which supports, and locks in the required position, a horizontal arm, of which that end overlying the rotary platform supports the slide seat of a vertical arm. To the lower end of said vertical arm there is connected a tool which acts against the tire edge to urge it below the edge of the wheel rim or to extract it therefrom.

Said rotary platform is driven by an electric motor positioned within the casing via a connection shaft, between which a speed step-down gear is interposed.

In those regions in which electricity for industrial use is distributed via a three-phase alternating current grid, the electric motor used for driving the machine can be of three-phase induction or single-phase induction type.

However in those regions in which electricity is distributed via a single-phase grid a single-phase induction motor is used.

The electricity supply voltage differs for different countries, for example in Italy the three-phase a.c. supply voltage is 380V and the single-phase supply is at 220V, whereas in the United States the electricity supply is single-phase a.c. at 110V.

This requires the manufacturers of this type of machine to diversify production in accordance with the voltage and type of electricity grid in the regions in which the product is to be sold.

This is made more difficult by the fact that tire removal machines require their rotary platform to be operated with a torque which has a substantial value at the low r.p.m. at which the platform rotates when the tool is in use.

In this respect, a three-phase or single-phase induction motor is known to have a characteristic torque curve in which the torque varies substantially as the r.p.m. varies, within a very narrow range.

SUMMARY OF THE INVENTION

There is therefore a requirement for a machine for mounting and removing tires on and from a wheel rim, the operation of which satisfies this torque requirement independently of the voltage and type of the power grid electricity.

The object of the invention is to provide a machine for tire mounting and removal on and from a wheel rim which overcomes the aforesaid drawbacks by virtue of the characteristics defined in the claims.

The operational and constructional characteristics of the invention will be more apparent from the ensuing description of a preferred embodiment thereof given by way of a non-limiting example with reference to the accompanying drawings.

DETAILED DESCRIPTION OF THE PREFERRED EMBODIMENTS

The figures show a casing 1, from a top 2 of which there emerges a shaft 3 which rotatably supports a platform 4.

Figure 1:
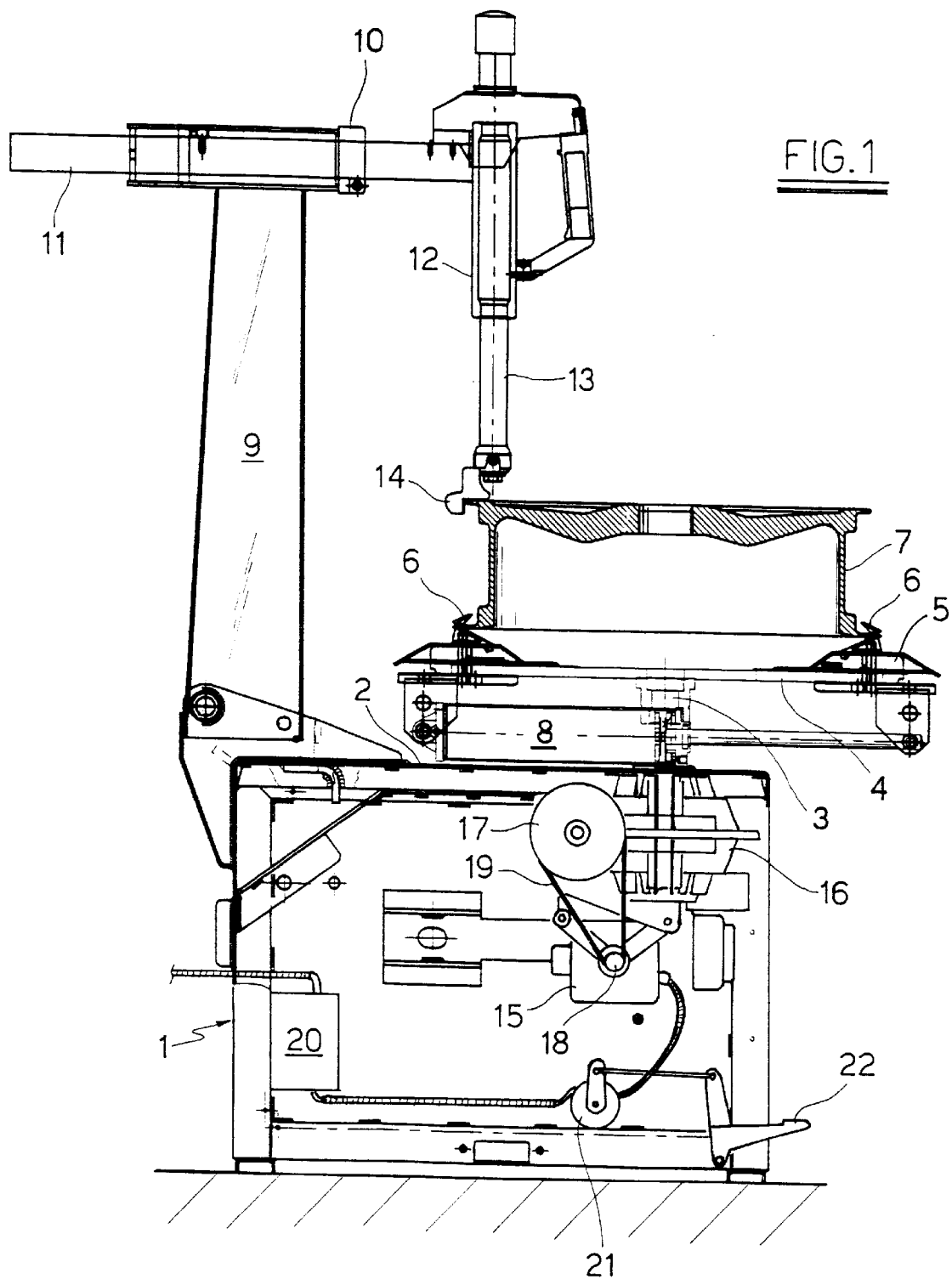
FIG. 1 is a side view of the machine of the invention.

As seen in FIG. 1, the circular platform 4 is provided with four usual radial slots, not shown, within which there move slides 5 upperly provided with jaws 6 for locking a wheel rim 7 in the working position. The slides 5 are driven by a usual pneumatic unit 8 supported within the lower part of the circular platform 4.

To the side of the circular platform 4 there upwardly extends a column 9, to the upper end of which there is connected a horizontal guide 10 within which a shaped rod 11 moves.

At the end of the shaped rod 11 there is supported a guide 12 of vertical axis, which receives and can lock thereto a rod 13, to the lower end of which a tool 14 which acts against the tire edge is connected.

The circular platform 4 is rotated about its axis by a electric motor 15, with means being interposed for reducing the rotational speed of the motor shaft.

Specifically, these means comprise a step-down gear 16 and a pair of pulleys 17 and 18, between which a belt 19 extends.

Figure 2:
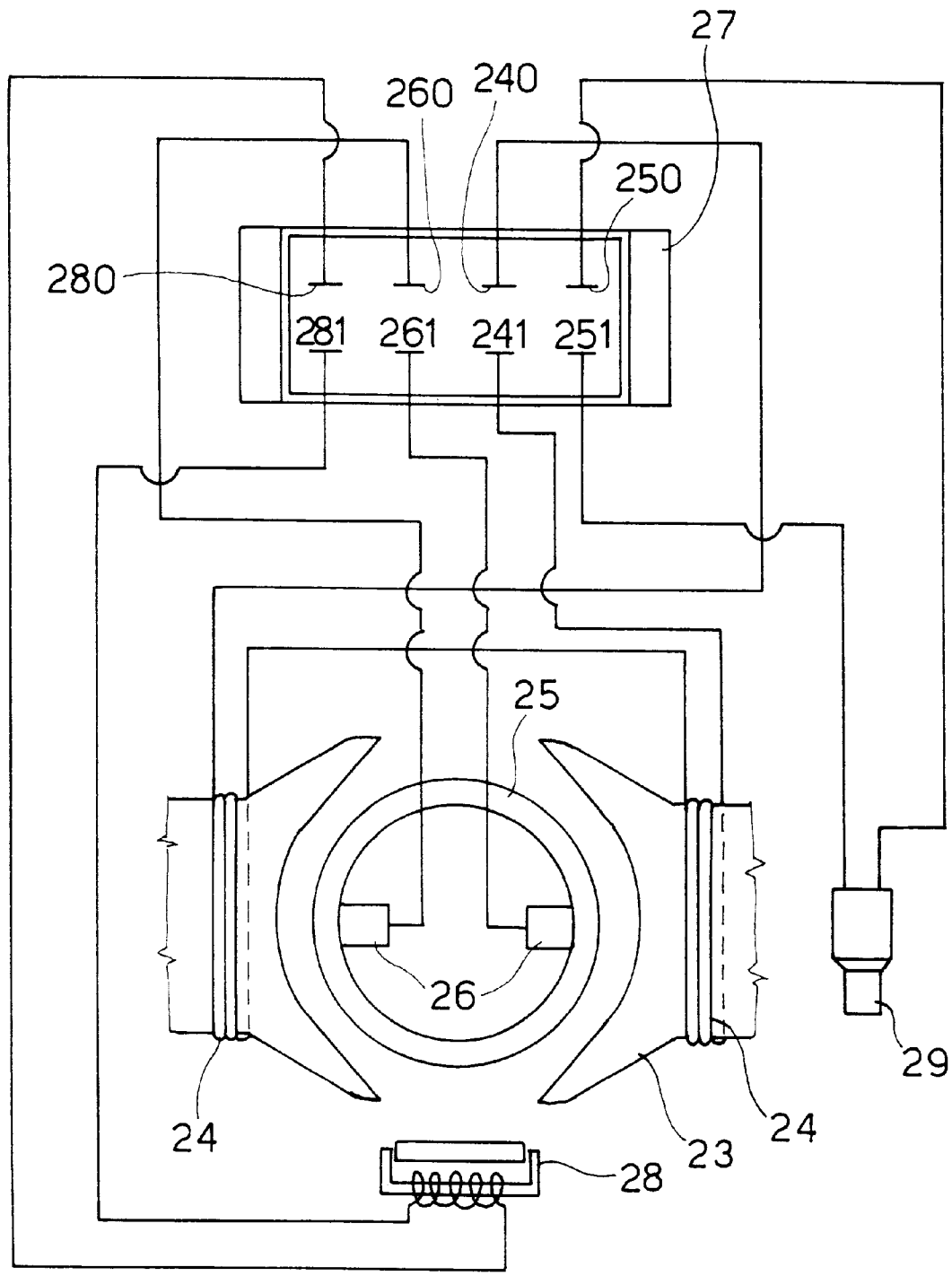
FIG. 2 is a schematic view of the drive motor for the machine of the invention.

The electric motor 15, shown schematically in FIG. 2, is of the series-excited single-phase type supplying a power output of between 350 W and 600 W with an absorbed current of between 10 A and 15 A.

The figure shows a stator 23 with its stator winding 24, a rotor 25 provided with brushes 26, and a terminal block 27 to which the ends of the stator and rotor circuits, 240, 241 and 260, 261 respectively, are connected.

Leads 280 and 281 from a speed indicator of tachometer type, and leads 290 and 291 from the motor thermal protection device, are also connected to the terminal block 27.

Figure 4:
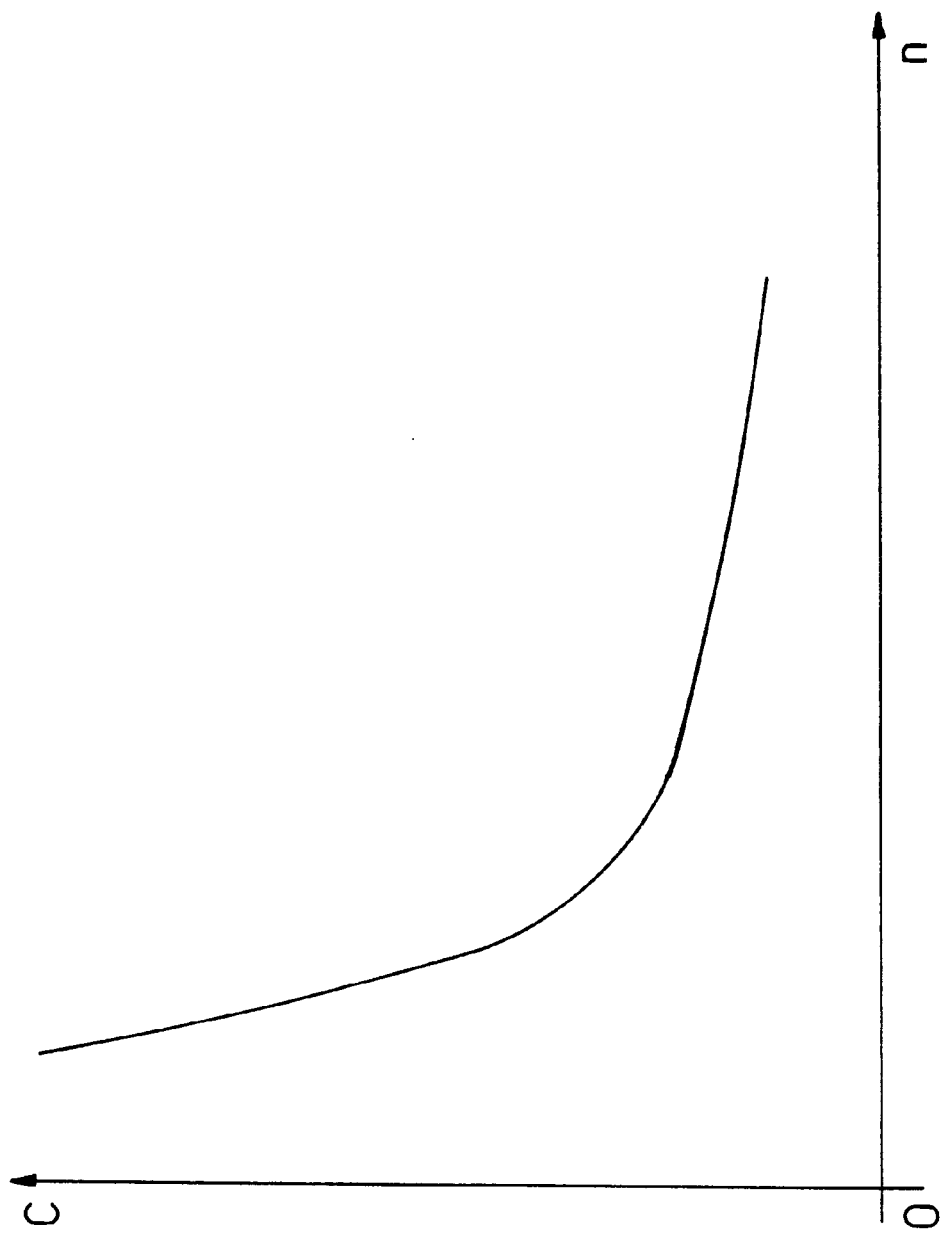
FIG. 4 shows the characteristic torque/r.p.m. curve of the electric motor used by the invention.

The characteristic torque/r.p.m. curve for a series-excited motor is shown in FIG. 4. This figure shows that as the resistant torque increases, the motor r.p.m. decreases and the developed torque increases. Hence this type of motor has an r.p.m. which varies considerably as the load varies, a characteristic well suited to tire removal machines, in which a low speed is required with high resistant torques, and a high speed when the resistant torque is low.

Between the power terminals of the electric motor 15 and the mains line there are connected an electronic card 20 for controlling and protecting the electric motor, and a reversing switch 21 operated by the start-stop pedal 22 of the tire removal machine.

The electric motor 15 is powered with 220V a.c. in those regions in which this electrical voltage is available, or otherwise at 110V a.c.

In this latter case the electronic card 20 will comprise a rectifier stage to rectify the 110V a.c. supply to about 150V d.c. (rectified), to provide the power required for mounting and/or removing the tire on or from the wheel rim.

Figure 3:
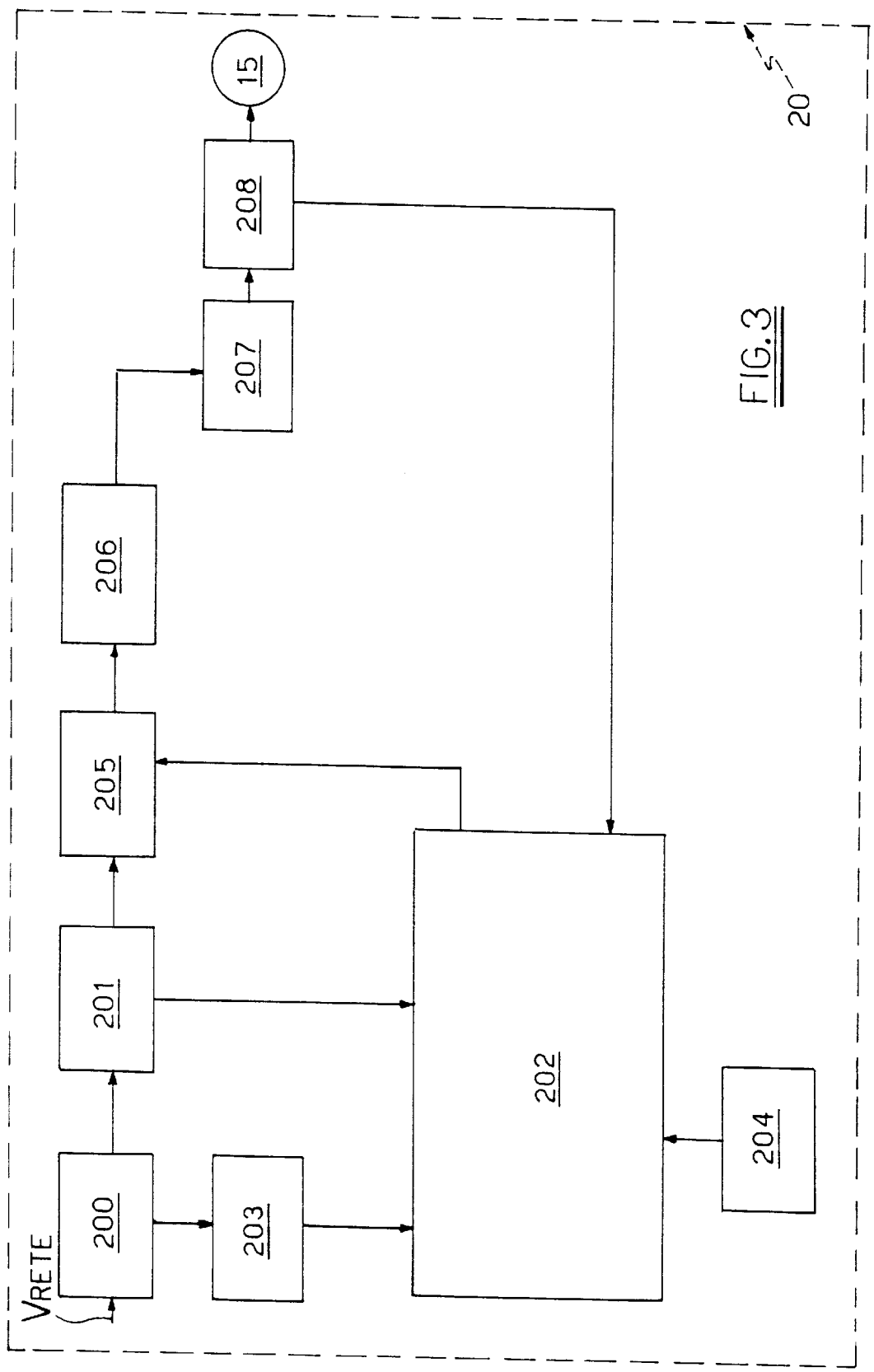
FIG. 3 shows the block diagram of the control and protection circuit for the machine of the invention.

The electronic card 20 for powering the motor with a d.c. voltage of about 150V is shown in the block diagram of FIG. 3.

The figure shows an initial stage 200 comprising components for filtering out the contaminating harmonics present in the mains a.c. supply and the protection devices at the input to the card 20.

Downstream of the stage 200 there is a stage 201 for measuring the current absorbed by the electric motor 15 and consisting for example of a usual ammeter-transformer which measures the current through the motor supply line and feeds the signal obtained to a measurement and control circuit represented by the block 202. The electric circuits represented by the block 202, which are not shown because they are of usual type, are powered by a power unit indicated by 203 in FIG. 3.

The block 202 comprises an input stage consisting of a rectifier and filter in which the a.c. signal from the ammeter-transformer is rectified, a comparator in which said rectified current signal is compared with a reference current value, generally the maximum current allowable through the motor to not exceed the desired torque, and set in the block 204, a memory circuit in which the measured value of the current signal is memorized, and a circuit for opening and closing the relay represented by the block 205.

Downstream of said block 205 there is a rectifier of usual type, indicated by 206, which rectifies the alternating current required by the electric motor 15.

Between said electric motor 15 and the block 205 there are connected a block 207 comprising a motor filter and a block 208 consisting of a reversing switch which acts as a general switch and enables the direction of rotation of the rotor of the electric motor 15 to be reversed by acting on the contacts of the terminal block 27.

During the operation of the tire removal machine the electric current absorbed by the line is proportional to the resistant torque applied to the shaft of the electric motor 15, which itself depends on the force applied to the tool 14 when it acts between the edge of the wheel rim and the edge of the tire.

If during the mounting or removal of the tire on or from the wheel rim the tool encounters difficulty in advancing, the resistant torque increases with corresponding motor r.p.m. decrease in accordance with the curve of FIG. 4. When the tool overcomes the point of opposition, the resistant torque decreases and the motor r.p.m. increases.

During the mounting or removal of the tire on or from the wheel rim, the absorbed current must always be less than a value determined by the manufacturer of the electric motor 15 in order not to damage the rotor brushes 26. In the illustrated example this determined value is 15 A, and is preset in the block 204 to provide an operating limit.

If during the operation of the tire removal machine the absorbed current exceeds the current value preset in the block 204, the control circuit for the relay 205 opens this latter to interrupt current feed to the electric motor 15.

Current feed is restored only after the operator releases the start pedal 22 of the tire removal machine, so cancelling the locked state memorized by the memory circuit, the control circuit for the relay 205 then reclosing this latter.

The described tire removal machine can also be powered with 220V a.c. by replacing the electronic card 20 with an electronic card similar to that shown but without the rectifier stage 206.

What is claimed is:

1. A tire removal machine comprising a rotary platform for supporting the wheel, means for acting on the tire bead and platform operating means, wherein the operating means are a single-phase electric motor with series excitation supplying a power output of between 350 W and 600 W with an absorbed current not exceeding 15 A, connected to a single-phase feed line at 110V a.c. via a voltage rectifier, and means being provided for limiting current absorption to a predetermined value.

2. A tire removal machine as claimed in claim 1, wherein the motor is connected to a single-phase 220V a.c. line without the voltage rectifier being connected therebetween.

3. A tire removal machine as claimed in claim 1, wherein the current absorption limiting means comprise a current meter, a rectifier, a comparator, a memory circuit and an opening circuit for a relay, which is subsequently closed by releasing a machine operating pedal.

4. The tire removal machine as claimed in claim 1, wherein the absorbed current is between 10 A and 15 A.

5. The tire removal machine as claimed in claim 3, wherein the comparator compares a rectified current signal, generated by the rectifier, to a reference current value.

* * * * *